United States Patent
Carlén Andersson et al.

(10) Patent No.: US 11,692,498 B2
(45) Date of Patent: Jul. 4, 2023

(54) INTERNAL COMBUSTION ENGINE SYSTEM AND METHOD FOR REDUCED TURBO LAG

(71) Applicant: VOLVO TRUCK CORPORATION, Gothenburg (SE)

(72) Inventors: Johan Carlén Andersson, Lund (SE); Fredrik Rahm, Hörby (SE); Ulf Aronsson, Lund (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/494,093

(22) Filed: Oct. 5, 2021

(65) Prior Publication Data
US 2022/0106919 A1   Apr. 7, 2022

(30) Foreign Application Priority Data
Oct. 7, 2020   (EP) .................................... 20200581

(51) Int. Cl.
*F02M 26/05* (2016.01)
*F02M 26/34* (2016.01)
(Continued)

(52) U.S. Cl.
CPC ......... *F02D 41/0007* (2013.01); *F01N 13/10* (2013.01); *F02B 37/12* (2013.01);
(Continued)

(58) Field of Classification Search
CPC ............. F02D 2200/60; F02D 41/0007; F02D 41/0077; F02D 9/02; F02D 9/04;
(Continued)

(56) References Cited

U.S. PATENT DOCUMENTS

| | | | |
|---|---|---|---|
| 6,435,166 B1 * | 8/2002 | Sato ....................... | F02M 26/05 123/568.21 |
| 2001/0017033 A1 | 8/2001 | McKinley et al. | |

(Continued)

FOREIGN PATENT DOCUMENTS

| | | |
|---|---|---|
| DE | 10-2010-063872 A1 | 7/2011 |
| DE | 20-2017-105126 U1 | 10/2017 |

(Continued)

OTHER PUBLICATIONS

Extended European Search Report, European Patent Application No. 20200581.5 dated Jun. 9, 2021, 7 pages.

*Primary Examiner* — J. Todd Newton
(74) *Attorney, Agent, or Firm* — Sage Patent Group

(57) ABSTRACT

Provided herein is internal combustion engine system including: an internal combustion engine; a turbocharger turbine operatively connected to a turbocharger compressor; an air intake system; an exhaust gas system; an exhaust gas recirculation (EGR) conduit; an EGR valve; and a turbomachine arranged in the EGR conduit. Further, the EGR valve and the turbomachine are positioned in relation to each other in the EGR conduit such that a flow of high pressure exhaust gas through the EGR conduit towards the air intake system reaches the EGR valve before reaching the turbomachine; an additional exhaust gas conduit is arranged between the EGR conduit and a point of the exhaust system downstream the turbocharger turbine so as to allow exhaust gas to flow.

17 Claims, 3 Drawing Sheets

(51) Int. Cl.
  *F02B 37/12* (2006.01)
  *F02D 9/04* (2006.01)
  *F02M 35/10* (2006.01)
  *F02D 41/00* (2006.01)
  *F01N 13/10* (2010.01)
  *F02D 9/02* (2006.01)

(52) U.S. Cl.
  CPC ............... *F02D 9/02* (2013.01); *F02D 9/04* (2013.01); *F02D 41/0077* (2013.01); *F02M 26/05* (2016.02); *F02M 26/34* (2016.02); *F02M 35/10157* (2013.01); F02D 2200/60 (2013.01)

(58) Field of Classification Search
  CPC .......... F01N 13/10; F02B 37/12; F02B 37/18; F02M 26/05; F02M 26/06; F02M 26/09; F02M 26/10; F02M 26/22; F02M 26/34; F02M 26/38; F02M 35/1015
  USPC ....................................................... 60/605.2
  See application file for complete search history.

(56) References Cited

U.S. PATENT DOCUMENTS

| | | | |
|---|---|---|---|
| 2006/0021346 A1 | 2/2006 | Whelan et al. | |
| 2011/0289914 A1 | 12/2011 | Afjeh | |
| 2014/0260245 A1* | 9/2014 | Eybergen | F02B 41/02 60/624 |
| 2019/0257231 A1* | 8/2019 | Dudar | F01N 13/10 |
| 2019/0277208 A1* | 9/2019 | Matoba | F02B 33/38 |
| 2021/0180545 A1* | 6/2021 | Rahm | F02D 41/062 |
| 2021/0231065 A1* | 7/2021 | Rahm | F02D 13/0269 |
| 2021/0310448 A1* | 10/2021 | Rahm | F02M 26/36 |
| 2022/0034283 A1* | 2/2022 | Andersson | F02D 41/0065 |
| 2022/0106919 A1* | 4/2022 | Carlén Andersson et al. | F02M 35/10157 |

FOREIGN PATENT DOCUMENTS

| | | |
|---|---|---|
| DE | 10-2017-128315 A1 | 6/2018 |
| ER | 1493907 A2 | 1/2005 |
| WO | WO 2004/057168 A1 | 7/2004 |
| WO | WO 2010/057910 A1 | 5/2010 |
| WO | WO 2020/052735 A1 | 3/2020 |

* cited by examiner

INTERNAL COMBUSTION ENGINE SYSTEM AND METHOD FOR REDUCED TURBO LAG

CROSS REFERENCE TO RELATED APPLICATIONS

This application claims foreign priority to European Patent Application No. 20200581.5, filed on Oct. 7, 2020, the disclosures and content of which are incorporated by reference herein in their entirety.

TECHNICAL FIELD

The invention relates to an internal combustion engine system and a method for operating an internal combustion engine system.

The invention may in particular be applied in heavy-duty vehicles, such as trucks, buses and construction equipment. Although the invention will be described with respect to a truck it is not restricted to this particular vehicle.

BACKGROUND

Internal combustion engine systems often include a turbocharging arrangement where exhaust gas drives a turbine connected to a compressor that in turn compresses intake air to be fed to the engine. A well-known issue with such engine systems is turbo lag, i.e. it takes some time for the turbocharging compressor to speed up after having slowed down during motoring or low-load operation.

DE102016224192 addresses this issue and proposes an engine system provided with a turbomachine in the form of an electrically driven compressor arranged in the intake duct combined with bypassing the engine via the EGR conduit for speeding up the turbocharger turbine. This is possibly useful for certain engine systems but where increased boost pressure, which also is focused on in DE102016224192, is not of significant importance, the proposed solution is rather costly. In addition, not all engine system can provide space for arranging an electrically driven compressor in the intake duct.

There is thus a need for improvements in this field.

SUMMARY

An object of the invention is to provide an internal combustion engine system that provides for reduced turbo lag in an efficient way. A further object is to provide a method for operating such an engine system. These objects are achieved by the engine system and method according to the corresponding independent claim.

In one aspect of the invention it relates to an internal combustion engine system comprising: an internal combustion engine provided with at least one cylinder; a turbocharger arrangement comprising a turbocharger turbine operatively connected to a turbocharger compressor; an air intake system arranged to feed intake air via the turbocharger compressor to the at least one cylinder; an exhaust gas system arranged to feed exhaust gas away from the at least one cylinder and to feed exhaust gas via the turbocharger turbine so as to drive the turbocharger compressor, an exhaust gas recirculation (EGR) conduit arranged between a point upstream the turbocharger turbine of the exhaust gas system and a point downstream the turbocharger compressor of the air intake system so as to allow recirculation of high pressure exhaust gas from the exhaust gas system to the air intake system; an EGR valve arranged in the EGR conduit so as to provide for regulation of a flow of gas through the EGR conduit; and a turbomachine configured to provide for a forced flow of gas in the internal combustion engine system.

Further, the turbomachine is arranged in the EGR conduit so as to allow for a forced flow of gas through the EGR conduit; the EGR valve and the turbomachine are positioned in relation to each other in the EGR conduit such that a flow of exhaust gas through the EGR conduit towards the air intake system reaches the EGR valve before reaching the turbomachine; an additional exhaust gas conduit is arranged between the EGR conduit and a point of the exhaust system downstream the turbocharger turbine so as to allow exhaust gas to flow between the EGR conduit and the point downstream the turbocharger turbine without passing through the turbocharger turbine, wherein the additional exhaust gas conduit is connected to the EGR conduit between the EGR valve and the turbomachine so as to provide a communication between the turbomachine and the additional exhaust gas conduit even if the EGR valve is closed; and an additional exhaust valve is arranged in connection with the additional exhaust gas conduit so as to provide for regulation of a flow of gas through the additional exhaust gas conduit.

To summarize, the ICE system comprises a combination of parts, e.g. a turbocharger arrangement, a high pressure EGR system, a turbomachine (such as a roots type blower EGR pump) arranged in EGR conduit, and a particular additional exhaust gas conduit (with valve) providing a connection between the exhaust system downstream the turbocharger turbine and the EGR conduit at a point downstream of the EGR valve and upstream of the EGR pump with reference to the normal direction of EGR flow through the EGR. The term point is in this disclosure used to generally mean location or position or similar.

Such an internal combustion engine system is useful for reducing turbo lag in that it can be subject to the following method of operation:

closing the EGR valve so as to prevent or at least significantly restrict a flow of recirculated exhaust gas through the EGR conduit;

opening the additional exhaust valve so as to allow exhaust gas to flow through the additional exhaust gas conduit into the EGR conduit; and operating the turbomachine so as to force exhaust gas that has passed the turbocharger turbine to flow through the additional exhaust gas conduit and further through the EGR conduit to the air intake system.

When operating the engine system according to above, a recirculation loop is created that allows gas to recirculate from the engine cylinder(s), through the exhaust system passing the turbocharger turbine, into the exhaust gas bypass conduit, further into the air intake system and back to the engine cylinder(s). And since the turbomachine is operated to drive the flow, a high gas flow rate can be achieved in this recirculation loop even if the total flow of gas through the engine system is small. In turn, a high gas flow rate in the recirculation loop means that the turbocharger turbine can be kept at a higher rotational speed, or be quickly speeded-up if allowed to slow down. The recirculation loop created increases turbine pressure ratio and turbo speed, and it also reduces engine motoring friction by decreasing gas exchange work. In short, a main effect is that turbo lag can be reduced or avoided at motoring or low-load situations.

In an embodiment the internal combustion engine system further comprises at least one main valve arranged to regulate a total flow of gas through the internal combustion engine system. The main valve may in the form of an intake throttle valve/ITV and/or exhaust valve/CLB. The method may then comprise also the following step:

partially or fully closing the at least one main valve so as to reduce the total flow of gas through the internal combustion engine system.

Operating the above engine system according to the above method with the additional step provides for an additional advantage in that it makes it possible to avoid cooling down an exhaust gas aftertreatment system (EATS) arranged downstream the turbine and downstream the additional exhaust gas conduit since the flow rate of cool exhaust gas passing the EATS can be significantly reduced. Most internal combustion engine systems are provided with an EATS arranged that way and a main valve of the above type, so for most engine systems the above engine system and method provides for double advantageous effects. It may be noted that the effect of reducing turbo lag is not dependent on the presence of any EATS.

A further advantage of the above internal combustion engine system is that one may dispense with arranging a conventional turbine bypass with e.g. a standard turbo-mounted waste-gate since the additional exhaust gas conduit and the corresponding valve can replace the conventional components by operating the engine system with both the EGR valve and the additional exhaust valve open. In such a case it is useful to make use of a turbo machine in the form of a roots type blower or similar since such a blower can act also as an additional EGR valve and thus close the EGR conduit (at a point closer to the air intake system) when (a portion of) the exhaust gas is fed through a portion of the EGR conduit and further through the additional exhaust gas conduit so as to bypass the turbine.

The EGR valve and the additional exhaust valve ("the waste-gate") may be combined in a multi-way valve, typically a three-way valve arranged where the additional exhaust gas conduit connects to the EGR conduit.

The main valve, i.e. typically an intake throttling valve and/or a main exhaust valve, and the drive speed of the turbomachine/EGR pump, is preferably properly controlled so as to avoid surge in the turbocharger compressor. To avoid issues related to compressor surge it may be advantageous to arrange a turbocharger compressor recirculation conduit in the air intake system that allows intake air to recirculate into the compressor and provide that conduit with a compressor recirculation valve (sometimes denoted discharge recirculation valve, DRV) to control the recirculation. This is further described below.

In an embodiment the at least one main valve includes an intake throttle valve in the air intake system arranged downstream the turbocharger compressor.

In an embodiment the at least one main valve includes a main exhaust valve arranged downstream the turbocharger turbine and downstream also the additional exhaust gas conduit.

One of or both the intake throttle valve and the main exhaust valve may be used in the step of partially or fully closing the at least one main valve so as to reduce the total flow of gas through the internal combustion engine system.

In an embodiment the EGR valve and the additional exhaust valve are separate valves arranged in or in connection with the EGR conduit and the additional exhaust gas conduit, respectively. Alternatively, the EGR valve and the additional exhaust valve form part of a common multiway valve arranged in connection with both the EGR conduit and the additional exhaust gas conduit.

In an embodiment the air intake system is provided with a compressor recirculation conduit connected to a main air intake channel upstream and downstream the turbocharger compressor, wherein the compressor recirculation conduit is provided with a compressor recirculation valve for controlling a flow of air through the compressor recirculation conduit.

The compressor recirculation valve is preferably opened when there is a risk for so-called surge in the turbocharger compressor. The risk for surge can be detected based on information about the air flow through the turbocharger compressor and the pressure ratio over the turbocharger compressor.

In an embodiment the internal combustion engine system is provided with an exhaust gas aftertreatment system (EATS) arranged downstream the turbocharger turbine and downstream also the additional exhaust gas conduit. In an embodiment the EATS is arranged downstream the main exhaust valve.

In an embodiment the turbomachine is a positive displacement machine configured to displace gas from an inlet to an outlet thereof by trapping a fixed amount of gas and forcing that trapped amount of gas from the inlet to the outlet. Such a turbomachine can effectively pump exhaust gas and can also be used as a valve capable of preventing any through-flow of gas (besides a very small flow due to leakage). In an embodiment the positive displacement machine is a rotary roots type blower having a pair of rotary members provided with meshing lobes.

In an embodiment the internal combustion engine system further comprises a variable drive unit arranged to drive the turbomachine, and wherein the internal combustion engine system is configured to control the drive unit so as to control a flow of exhaust gas through the positive displacement machine.

In another aspect of the invention it relates to a method for operating an internal combustion engine system of the above type, where the method comprises the steps of:

closing the EGR valve so as to prevent or at least significantly restrict a flow of recirculated exhaust gas through the EGR conduit;

opening the additional exhaust valve so as to allow exhaust gas to flow through the additional exhaust gas conduit into the EGR conduit; and operating the turbomachine so as to force exhaust gas that has passed the turbocharger turbine to flow through the additional exhaust gas conduit and further through the EGR conduit to the air intake system.

In an embodiment where the engine system is provided with at least one main valve arranged to regulate a total flow of gas through the internal combustion engine system, the method may include the step of:

partially or fully closing the at least one main valve so as to reduce the total flow of gas through the internal combustion engine system.

In an embodiment the step of partially or fully closing the at least one main valve comprises the step of:

partially or fully closing an intake throttle valve arranged in the air intake system downstream the turbocharger compressor and/or partially or fully closing a main exhaust valve arranged downstream the turbocharger turbine and downstream also the additional exhaust gas conduit.

In an embodiment the steps of closing the EGR valve and opening the additional exhaust valve are carried out by:

closing a separate EGR valve arranged in or in connection with the EGR conduit and opening a separate additional exhaust valve arranged in or in connection with the exhaust bypass conduit;

or operating a multiway valve arranged in connection with both the EGR conduit and the additional exhaust gas conduit, wherein the multiway valve is configured to be operated both as the EGR valve as well as the additional exhaust valve.

In an embodiment the method comprises the steps of:

determining a current torque of the internal combustion engine and determining whether the current torque is below a threshold level, or determining a current pedal position or other request for torque and determining whether the current pedal position or request for torque is below a threshold level, then, if the current torque or the pedal position/requested torque is below the corresponding threshold, and performing the method according to above.

This is thus a triggering procedure for starting the general steps of the method. This triggering procedure may run more or less continuously, for instance, while the internal combustion engine systems operates in a normal mode in which exhaust gas may be recirculated through the EGR conduit in a conventional manner with the EGR valve open and the additional exhaust valve closed, and with the turbomachine set to some drive level, which may depend on e.g. the particular operation conditions of the engine system. The request for torque may be an internal value in a control algorithm requested by the engine system depending on the conditions, such as the pedal position in combination with combined conditions of electric motors and the internal combustion engine in a hybrid vehicle. Further, in an autonomous vehicle the request for torque is not based on a driver's action on a physical accelerator pedal but may be based on a signal representing the position of a physical pedal.

In an embodiment the method comprises the step of controlling a drive speed of the turbomachine arranged in the EGR conduit based on at least one of the following control parameters:

keep a turbocharger arrangement rotation speed within a given interval;

keep a total exhaust gas flow out from the internal combustion engine system below a threshold level;

keep a ratio between the mass flow of exhaust gas passing through the turbomachine and the total mass flow of gas supplied to the engine within a given interval; and/or keep the drive speed of the turbomachine within a given interval.

The given interval for the turbomachine drive speed may be different for engine speeds.

To interrupt the method a step may be included where it is determined whether the current torque or the pedal position/requested torque is above the corresponding threshold. If so, the system may be set to go back to normal operation mode.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

DETAILED DESCRIPTION OF EXAMPLE EMBODIMENTS OF THE INVENTION

Figure 1:
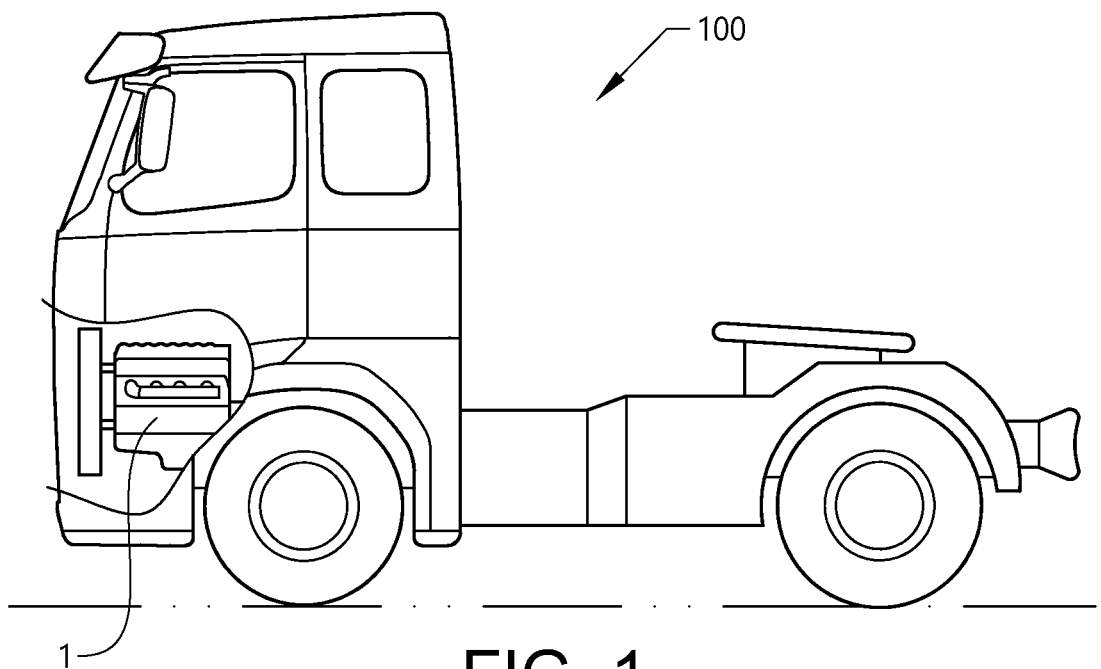
FIG. 1 shows a vehicle in the form of a truck provided with an internal combustion engine system.
Figure 2:
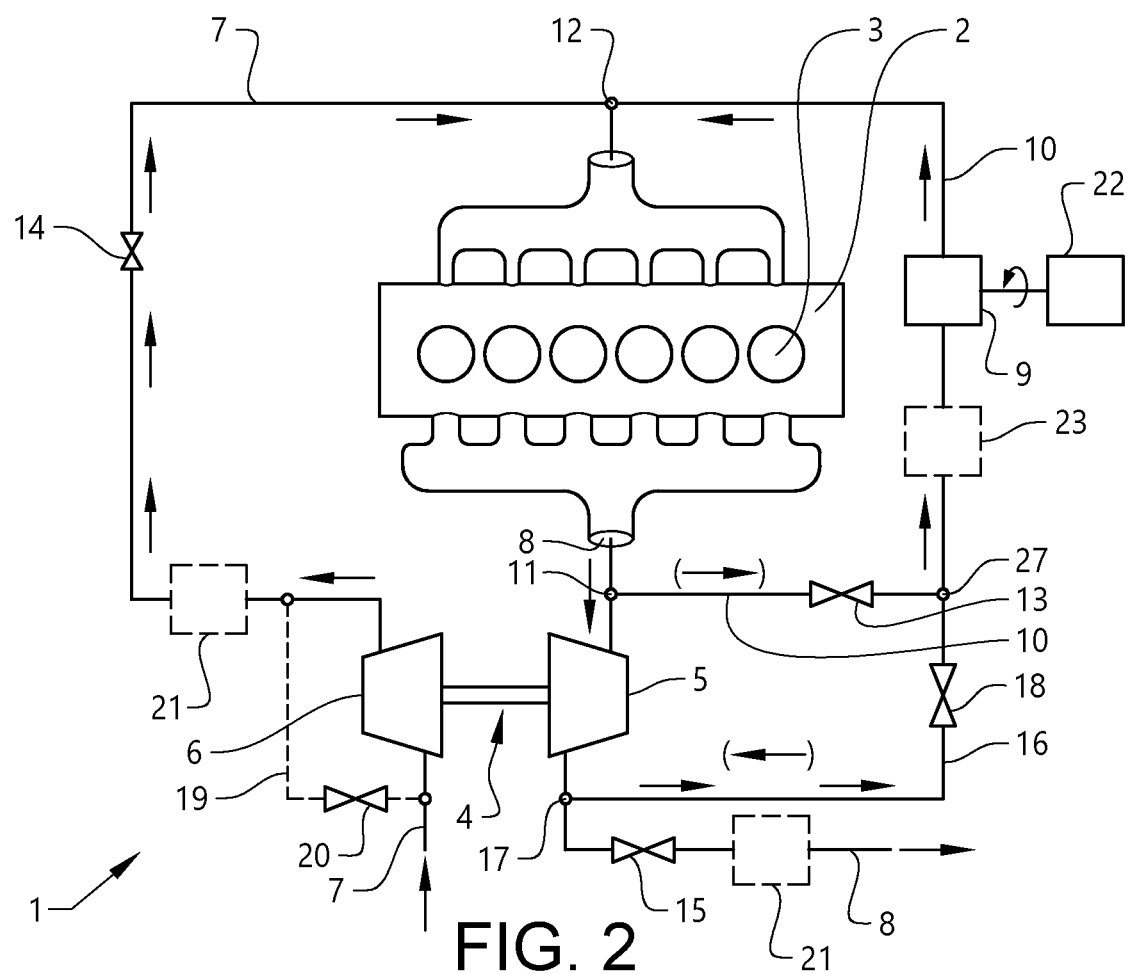
FIG. 2 shows, in a schematic view, an example embodiment of an internal combustion engine system according to the invention.

FIG. 1 shows a vehicle in the form of a truck 100 provided with an internal combustion engine system 1. FIG. 2 shows, in a schematic view, an example embodiment of the internal combustion engine system 1.

As indicated in FIG. 2, the internal combustion engine system 1 comprises an internal combustion engine 2 provided with in this case six cylinders 3. A turbocharger arrangement 4 comprising a turbocharger turbine 5 operatively connected to a turbocharger compressor 6 feeds intake air to the engine 2 via an air intake system 7. An exhaust gas system 8 is arranged to feed exhaust gas away from the engine 2 and its cylinders 3 via the turbocharger turbine 5 so as to drive the turbocharger compressor 6. An exhaust gas recirculation (EGR) conduit 10 is arranged between a point (i.e. location or position) 11 upstream the turbocharger turbine 5 of the exhaust gas system and a point 12 downstream the turbocharger compressor 6 of the air intake system 7 so as to allow recirculation of high pressure exhaust gas from the exhaust gas system 8 to the air intake system 7.

Further, an EGR valve 13 is arranged in the EGR conduit 10 so as to provide for regulation of a flow of the high pressure exhaust gas through the EGR conduit 10. The system 1 is in this example provided with two main valves arranged to regulate a total flow of gas through the internal combustion engine system 1: an intake throttle valve 14 arranged downstream the turbocharger compressor 6 in the air intake system 7 and a main exhaust valve 15 arranged downstream the turbocharger turbine 5 and downstream also the additional exhaust gas conduit 16.

Figure 3:
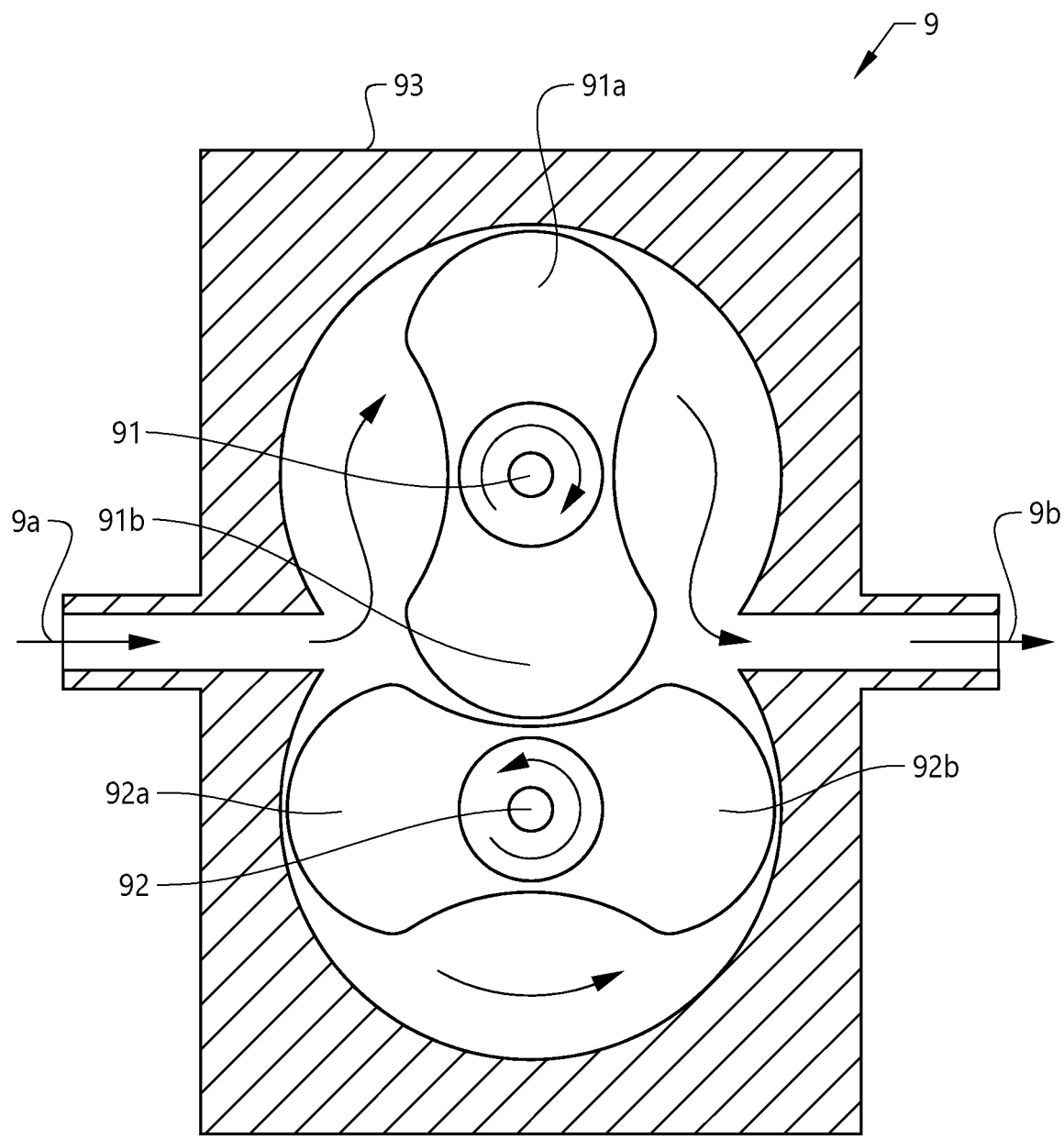
FIG. 3 shows, in a schematic view, a turbomachine in the form of a Roots-type blower forming part of the embodiment of FIG. 2.

A turbomachine 9 is arranged in the EGR conduit 10 so as to provide for a forced flow of gas through the EGR conduit 10. As shown in FIG. 3, the turbomachine is in this case a positive displacement machine 9 configured to displace gas from an inlet 9a to an outlet 9b thereof by trapping a fixed amount of gas and forcing that trapped amount of gas from the inlet 9a to the outlet 9b. Further, the positive displacement machine 9 is a rotary roots type blower having a pair of rotary members 91, 92 provided with meshing lobes 91a, 91b, 92a, 92b.

The internal combustion engine system 1 further comprises a variable drive unit 22 arranged to drive the turbomachine 9, and the internal combustion engine system 1 is configured to control the drive unit 22 so as to control a flow of exhaust gas through the turbomachine 9. The drive unit 22 may be an electric motor.

As shown in FIG. 2, the EGR valve 13 and the turbomachine 9 are positioned in relation to each other in the EGR conduit 10 such that a flow of high pressure exhaust gas through the EGR conduit 10 towards the air intake system 7 reaches the EGR valve 13 before reaching the turbomachine 9. That is, the EGR valve 13 is positioned upstream the turbomachine 9 with reference to a flow of exhaust gas from the engine 2 through the EGR conduit 10 towards the air intake system 7.

An additional exhaust gas conduit 16 is arranged between the EGR conduit 10 and a point 17 of the exhaust system 8 downstream the turbocharger turbine 5 so as to allow exhaust gas to flow between the EGR conduit 10 and the point 17 downstream the turbocharger turbine 5 without passing through the turbocharger turbine 5. Gas can thus flow in any direction through the additional exhaust gas conduit 16 depending on the settings of the engine system 1. The additional exhaust gas conduit 16 is connected to the EGR conduit at a point 27 between the EGR valve 13 and the turbomachine 9 so as to provide a communication between the turbomachine 9 and the additional exhaust gas conduit 16 even if the EGR valve 13 is closed. An additional exhaust valve 18 is arranged in connection with the additional exhaust gas conduit 16 so as to provide for regulation of a flow of gas through the additional exhaust gas conduit 16.

Arrows in FIG. 2 indicate a flow direction of gas in an operation mode where the EGR valve 13 is closed, where the additional exhaust valve 18 is open and where the turbomachine/blower 9 is operating so as to force gas towards the intake system 7, which means that some fraction of the exhaust gas that has passed through the turbine 5 is recirculated through the additional exhaust gas conduit 16 and through a part of the EGR conduit 10 back to the intake system 7 and into the engine 2.

Arrows within brackets in FIG. 2 indicate gas flow directions in other operation modes. One example is a normal operation mode of the engine system 1 where the EGR valve 13 is open and the additional exhaust valve 18 is closed so that high pressure exhaust gas recirculates in a conventional way (besides that the blower 9 can force the flow) through the entire EGR conduit 10. Another example is that both the EGR valve 13 and the additional exhaust valve 18 are open while the positive displacement machine 9 is stopped so as to function as an additional EGR valve. (The positive displacement machine with meshing lobes etc. used in this example is capable of functioning as a closed valve. In contrast, a regular compressor does not have this capability as gas can flow between the stationary blades.) In such a mode the exhaust system 8 of the engine system 1 works as a wastegate where exhaust gas bypasses the turbine 5 before being expelled from the engine system 1. By operating the displacement machine 9 in a reverse mode (which is possible with the exemplified positive displacement machine) it is also possible to let part or all of the intake air bypass the engine 2 and flow "backwards" through the EGR conduit and further through the turbine 5 or through the additional conduit 16.

The air intake system 7 may be provided with a compressor recirculation conduit 19 connected to a main air intake channel upstream and downstream the turbocharger compressor 6 and the compressor recirculation conduit 19 may be provided with a compressor recirculation valve 20 for controlling a flow of air through the compressor recirculation conduit 19.

The internal combustion engine system 1 may further be provided with an exhaust gas aftertreatment system (EATS) 21 arranged downstream the turbocharger turbine 5 and downstream also both the additional exhaust gas conduit 16 and the main exhaust valve 15. The EATS 21 may include various components for reducing the amounts of e.g. NOx and particles before releasing the exhaust gas to the surroundings.

An intake air cooler 21 and an EGR cooler 23 may also be included in the engine system 1.

The internal combustion engine system 1 is further provided with a control system including a control unit/circuitry (not shown) and various sensors and activators (not shown) for controlling various system components, such as the valves 13, 14, 15, 18, 20 and the variable drive unit 22, and for controlling the engine system 1 as a whole. Examples of control signals that are sent to the control unit are current torque of the internal combustion engine 2, current position of accelerator pedal or other request for torque, turbo arrangement rotation speed, the temperature at various points in the system 1, current setting of valves, information on gas flow rates at various points, drive speed of the turbomachine 9, etc. The control unit is configured to control the system 1 based on control signal input and various pre-set routines or maps and is also capable of determining whether certain values are below or above certain thresholds and of controlling the system 1 based on e.g. such determinations.

It can be noted that in the example embodiment shown in FIG. 2 the EGR valve 13 and the additional exhaust valve 18 are illustrated as separate valves arranged in or in connection with the EGR conduit 10 and the additional exhaust gas conduit 16, respectively. However, the EGR valve 13 and the additional exhaust valve 18 may instead form part of a common multiway valve arranged in connection with both the EGR conduit 10 and the additional exhaust gas conduit 16. With reference to FIG. 2 such a multiway valve may be arranged at the point 27.

Figure 4:
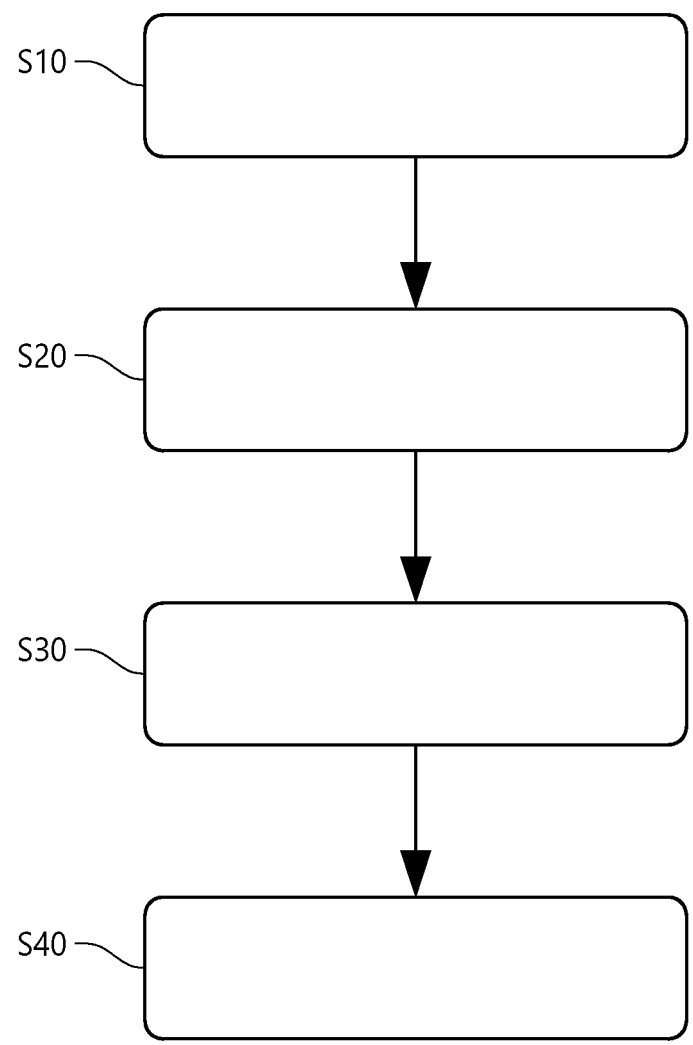
FIG. 4 shows a flow chart for an example embodiment of a method according to the invention.

FIG. 4 shows a flow chart for an example embodiment of a method according to the invention. The exemplified method may start out from a situation where the internal combustion engine system 1 operates in a normal operation mode where the EGR valve 13 is open, the additional exhaust valve 18 is closed and the displacement machine 9 is operating so that high pressure exhaust gas recirculates through the entire EGR conduit 10. The exemplified method comprises the following steps:

S10—closing the EGR valve 13 so as to prevent or at least significantly restrict a flow of recirculated high pressure exhaust gas through the EGR conduit 10;

S20—opening the additional exhaust valve 18 so as to allow exhaust gas to flow through the additional exhaust gas conduit 16 into the EGR conduit 10;

S30—operating the turbomachine 9 so as to force exhaust gas that has passed the turbocharger turbine 5 to flow through the additional exhaust gas conduit 16 and further through the EGR conduit 10 to the air intake system 7; and S40—partially or fully closing the at least one main valve, i.e. the intake throttle valve 14 and/or the main exhaust valve 15 in the example shown here, so as to reduce the total flow of gas through the internal combustion engine system 1.

Steps 10 and 20 are in this example carried out by closing the separate EGR valve 13 and opening the separate additional exhaust valve 18. If the system 1 instead is provided with a common multivalve configured to be operated both as the EGR valve as well as the additional exhaust valve as mentioned above, the step would instead be to operate that multiway valve such that the same effect is achieved.

As mentioned previously, step S40 is not necessary for speeding up the turbocharger arrangement 4 but is instead primarily used for avoiding cooling down the EATS 21.

The method may comprise the step of controlling the drive speed of the turbomachine 9 arranged in the EGR conduit 10 based on at least one of the following control parameters:

keep a rotation speed of the turbocharger arrangement 4 within a given interval;

keep a total exhaust gas flow out from the internal combustion engine system 1 below a threshold level;

keep a ratio between the mass flow of exhaust gas passing through the turbomachine 9 and the total mass flow of gas supplied to the engine 2 within a given interval; and/or keep the drive speed of the turbomachine 9 within a given interval.

The method may also comprise the following step:

S05A—determining a current torque of the internal combustion engine 2 and determining whether the current torque is below a threshold level, or, S05B—determining a current pedal position or other request for torque and determining whether the current pedal position or request for torque is below a threshold level, then, if the current torque or the pedal position/requested torque is below the corresponding threshold, performing steps S10-S40.

The above is thus a trigger-step for initiating steps S10-S40. Another parameter that might be used for trigging the method or that might form part in triggering the method is an exhaust gas or EATS temperature that is below a certain threshold. A predictive control strategy may also be involved, see below.

To switch (back) to the normal operation mode, the method may include the steps of determining if the current torque or the pedal position/requested torque, or the temperature, is above the corresponding threshold and, if so, opening the EGR valve 13, closing the additional exhaust valve and, depending on e.g. requested torque, adapting operation of the turbomachine 9 and partially or fully opening the intake throttle valve 14 and/or the main exhaust valve 15.

The control unit is thus configured to perform the method steps described above.

As to the control strategy the following can be added:
1. Detect engine motoring or low torque in EMS/control unit. Could be torque, indicated torque or pedal position below a certain threshold.
    Measuring or predicting a low exhaust temperature, EATS temperature, ambient temperature or coolant temperature in combination with detecting motoring or low torque could also be the trigger.
    Furthermore, the controls could be connected to a predictive control strategy (knowledge of what will happen in the future). E.g. if a large uphill is in front of the truck, there might be no need to use a method to keep EATS heat.
2. Close EGR valve 13 and open the additional exhaust valve 18. Run the EGR pump/turbomachine 9 to flow gas from after the turbo turbine 5 to the intake manifold 7.
3. Control the speed of the EGR pump/turbomachine 9. This could be done in many ways, e.g.:
    Control to keep a certain turbo speed. If turbo speed is considered too low, it can be increased by increasing the EGR pump speed.
    Control to keep the exhaust flow through the EATS below a certain threshold. If the gas flow through the EATS is considered too high, it can be reduced by increasing the EGR pump speed.
    Control the pump speed from a pre-set flow map.
    Control the pump speed from a pre-set EGR flow fraction map (mass flow fraction of the total gas mass flow into the engine).
    Control the pump speed from a pre-set pump speed map.
4. If a higher torque than the threshold level (described in 1. above) is detected, the additional exhaust valve 18 should be closed again. The EGR valve 13 can be opened again or be kept closed if a fast transient is requested (e.g. full throttle from driver, high rate of pedal increase or low air/fuel ratio).

It is to be understood that the present invention is not limited to the embodiments described above and illustrated in the drawings; rather, the skilled person will recognize that many changes and modifications may be made within the scope of the appended claims.

The invention claimed is:

1. An internal combustion engine system comprising:
    an internal combustion engine provided with at least one cylinder;
    a turbocharger arrangement comprising a turbocharger turbine operatively connected to a turbocharger compressor;
    an air intake system arranged to feed intake air via the turbocharger compressor to the at least one cylinder;
    an exhaust gas system arranged to feed exhaust gas away from the at least one cylinder and to feed exhaust gas via the turbocharger turbine so as to drive the turbocharger compressor;
    an exhaust gas recirculation (EGR) conduit arranged between a point upstream the turbocharger turbine of the exhaust gas system and a point downstream the turbocharger compressor of the air intake system so as to allow recirculation of high pressure exhaust gas from the exhaust gas system to the air intake system;
    an EGR valve arranged in the EGR conduit so as to provide for regulation of a flow of the high pressure exhaust gas through the EGR conduit; and
    a turbomachine configured to provide for a forced flow of gas in the internal combustion engine system,
    wherein the turbomachine is arranged in the EGR conduit so as to allow for a forced flow of gas through the EGR conduit,
    wherein the EGR valve and the turbomachine are positioned in relation to each other in the EGR conduit such that a flow of high pressure exhaust gas through the EGR conduit towards the air intake system reaches the EGR valve before reaching the turbomachine,
    wherein an additional exhaust gas conduit is arranged between the EGR conduit and a point of the exhaust system downstream the turbocharger turbine so as to allow exhaust gas to flow between the EGR conduit and the point downstream the turbocharger turbine without passing through the turbocharger turbine, wherein the additional exhaust gas conduit is connected to the EGR conduit at a point between the EGR valve and the turbomachine so as to provide a communication between the turbomachine and the additional exhaust gas conduit even if the EGR valve is closed,
    wherein an additional exhaust valve is arranged in connection with the additional exhaust gas conduit so as to provide for regulation of a flow of gas through the additional exhaust gas conduit, and
    wherein the internal combustion engine system is provided with an exhaust gas aftertreatment system (EATS) arranged downstream the turbocharger turbine and downstream also the additional exhaust gas conduit.

2. The internal combustion engine system according to claim 1, wherein the system further comprises at least one main valve arranged to regulate a total flow of gas through the internal combustion engine system.

3. The internal combustion engine system according to claim 2, wherein the at least one main valve includes an intake throttle valve in the air intake system arranged downstream the turbocharger compressor, and/or wherein the at least one main valve includes a main exhaust valve arranged downstream the turbocharger turbine and downstream also the additional exhaust gas conduit.

4. The internal combustion engine system according to claim 1, wherein the EGR valve and the additional exhaust valve are separate valves arranged in or in connection with the EGR conduit and the additional exhaust gas conduit, respectively, or wherein the EGR valve and the additional exhaust valve form part of a common multiway valve arranged in connection with both the EGR conduit and the additional exhaust gas conduit.

5. The internal combustion engine system according to claim 1, wherein the air intake system is provided with a compressor recirculation conduit connected to a main air intake channel upstream and downstream the turbocharger compressor, wherein the compressor recirculation conduit is provided with a compressor recirculation valve for controlling a flow of air through the compressor recirculation conduit.

6. The internal combustion engine system according to claim 3, wherein the at least one main valve includes the main exhaust valve arranged downstream the turbocharger turbine and downstream also the additional exhaust gas conduit, and wherein the EATS is arranged downstream the main exhaust valve.

7. The internal combustion engine system according to claim 1, wherein the turbomachine is a positive displacement machine configured to displace gas from an inlet to an outlet thereof by trapping a fixed amount of gas and forcing that trapped amount of gas from the inlet to the outlet.

8. The internal combustion engine system according to claim 7, wherein the positive displacement machine is a rotary roots type blower having a pair of rotary members provided with meshing lobes.

9. The internal combustion engine system according to claim 1, wherein the internal combustion engine system further comprises a variable drive unit arranged to drive the turbomachine, and wherein the internal combustion engine system is configured to control the drive unit so as to control a flow of exhaust gas through the turbomachine.

10. Method for operating an internal combustion engine system comprising:
an internal combustion engine provided with at least one cylinder;
a turbocharger arrangement comprising a turbocharger turbine operatively connected to a turbocharger compressor;
an air intake system arranged to feed intake air via the turbocharger compressor to the at least one cylinder;
an exhaust gas system arranged to feed exhaust gas away from the at least one cylinder and to feed exhaust gas via the turbocharger turbine so as to drive the turbocharger compressor;
an exhaust gas recirculation (EGR) conduit arranged between a point upstream the turbocharger turbine of the exhaust gas system and a point downstream the turbocharger compressor of the air intake system so as to allow recirculation of high pressure exhaust gas from the exhaust gas system to the air intake system;
an EGR valve arranged in the EGR conduit so as to provide for regulation of a flow of the high pressure exhaust gas through the EGR conduit; and
a turbomachine configured to provide for a forced flow of gas in the internal combustion engine system,
wherein the turbomachine is arranged in the EGR conduit so as to allow for a forced flow of gas through the EGR conduit,
wherein the EGR valve and the turbomachine are positioned in relation to each other in the EGR conduit such that a flow of high pressure exhaust gas through the EGR conduit towards the air intake system reaches the EGR valve before reaching the turbomachine,
wherein an additional exhaust gas conduit is arranged between the EGR conduit and a point of the exhaust system downstream the turbocharger turbine so as to allow exhaust gas to flow between the EGR conduit and the point downstream the turbocharger turbine without passing through the turbocharger turbine, wherein the additional exhaust gas conduit is connected to the EGR conduit at a point between the EGR valve and the turbomachine so as to provide a communication between the turbomachine and the additional exhaust gas conduit even if the EGR valve is closed,
wherein an additional exhaust valve is arranged in connection with the additional exhaust gas conduit so as to provide for regulation of a flow of gas through the additional exhaust gas conduit, and
wherein the internal combustion engine system is provided with an exhaust gas aftertreament system (EATS) arranged downstream the turbocharger turbine and downstream also the additional exhaust gas conduit,
the method comprising;
closing the EGR valve so as to restrict a flow of recirculated high pressure exhaust gas through the EGR conduit;
opening the additional exhaust valve so as to allow exhaust gas to flow through the additional exhaust gas conduit into the EGR conduit; and
operating the turbomachine so as to force exhaust gas that has passed the turbocharger turbine to flow through the additional exhaust gas conduit and further through the EGR conduit to the air intake system.

11. Method for operating an internal combustion engine system according to claim 10, wherein the system comprises at least one main valve arranged to regulate a total flow of gas through the internal combustion engine system and wherein the method comprises the step of:
partially or fully closing the at least one main valve so as to reduce the total flow of gas through the internal combustion engine system.

12. Method for operating an internal combustion engine system according to claim 11, wherein the step of partially or fully closing the at least one main valve comprises the step of:
partially or fully closing an intake throttle valve arranged in the air intake system downstream the turbocharger compressor and/or partially or fully closing a main exhaust valve arranged downstream the turbocharger turbine and downstream also the additional exhaust gas conduit.

13. Method for operating an internal combustion engine system according to claim 10, wherein the steps of closing the EGR valve and opening the additional exhaust valve are carried out by:

closing a separate EGR valve arranged in or in connection with the EGR conduit and opening a separate additional exhaust valve arranged in or in connection with the exhaust bypass conduit;
or
operating a multiway valve arranged in connection with both the EGR conduit and the additional exhaust gas conduit, wherein the multiway valve is configured to be operated both as the EGR valve as well as the additional exhaust valve.

14. Method for operating an internal combustion engine system according to claim 10, wherein the method comprises the steps of:
    determining a current torque of the internal combustion engine and determining whether the current torque is below a threshold level, or
    determining a current pedal position or other request for torque and determining whether the current pedal position or request for torque is below a threshold level,
    then, if the current torque or the pedal position/requested torque is below the corresponding threshold.

15. Method for operating an internal combustion engine system according to claim 10, wherein the method comprises the step of controlling a drive speed of the turbomachine arranged in the EGR conduit based on at least one of the following control parameters:
    keep a rotation speed of the turbocharger arrangement within a given interval;
    keep a total exhaust gas flow out from the internal combustion engine system below a threshold level;
    keep a ratio between the mass flow of exhaust gas passing through the turbomachine and the total mass flow of gas supplied to the engine within a given interval; and/or
    keep the drive speed of the turbomachine within a given interval.

16. A vehicle comprising an internal combustion engine system according to claim 1.

17. A control system comprising circuitry configured to:
    control an internal combustion engine system comprising:
        an internal combustion engine provided with at least one cylinder;
        a turbocharger arrangement comprising a turbocharger turbine operatively connected to a turbocharger compressor;
        an air intake system arranged to feed intake air via the turbocharger compressor to the at least one cylinder;
        an exhaust gas system arranged to feed exhaust gas away from the at least one cylinder and to feed exhaust gas via the turbocharger turbine so as to drive the turbocharger compressor;
        an exhaust gas recirculation (EGR) conduit arranged between a point upstream the turbocharger turbine of the exhaust gas system and a point downstream the turbocharger compressor of the air intake system so as to allow recirculation of high pressure exhaust gas from the exhaust gas system to the air intake system;
        an EGR valve arranged in the EGR conduit so as to provide for regulation of a flow of the high pressure exhaust gas through the EGR conduit; and
        a turbomachine configured to provide for a forced flow of gas in the internal combustion engine system,
        wherein the turbomachine is arranged in the EGR conduit so as to allow for a forced flow of gas through the EGR conduit,
        wherein the EGR valve and the turbomachine are positioned in relation to each other in the EGR conduit such that a flow of high pressure exhaust gas through the EGR conduit towards the air intake system reaches the EGR valve before reaching the turbomachine,
        wherein an additional exhaust gas conduit is arranged between the EGR conduit and a point of the exhaust system downstream the turbocharger turbine so as to allow exhaust gas to flow between the EGR conduit and the point downstream the turbocharger turbine without passing through the turbocharger turbine, wherein the additional exhaust gas conduit is connected to the EGR conduit at a point between the EGR valve and the turbomachine so as to provide a communication between the turbomachine and the additional exhaust gas conduit even if the EGR valve is closed,
        wherein an additional exhaust valve is arranged in connection with the additional exhaust gas conduit so as to provide for regulation of a flow of gas through the additional exhaust gas conduit, and
        wherein the internal combustion engine system is provided with an exhaust gas aftertreament system (EATS) arranged downstream the turbocharger turbine and downstream also the additional exhaust gas conduit,
    the circuitry further configured to:
        close the EGR valve so as to restrict a flow of recirculated high pressure exhaust gas through the EGR conduit;
        open the additional exhaust valve so as to allow exhaust gas to flow through the additional exhaust gas conduit into the EGR conduit; and
        operate the turbomachine so as to force exhaust gas that has passed the turbocharger turbine to flow through the additional exhaust gas conduit and further through the EGR conduit to the air intake system.

* * * * *